UNITED STATES PATENT OFFICE.

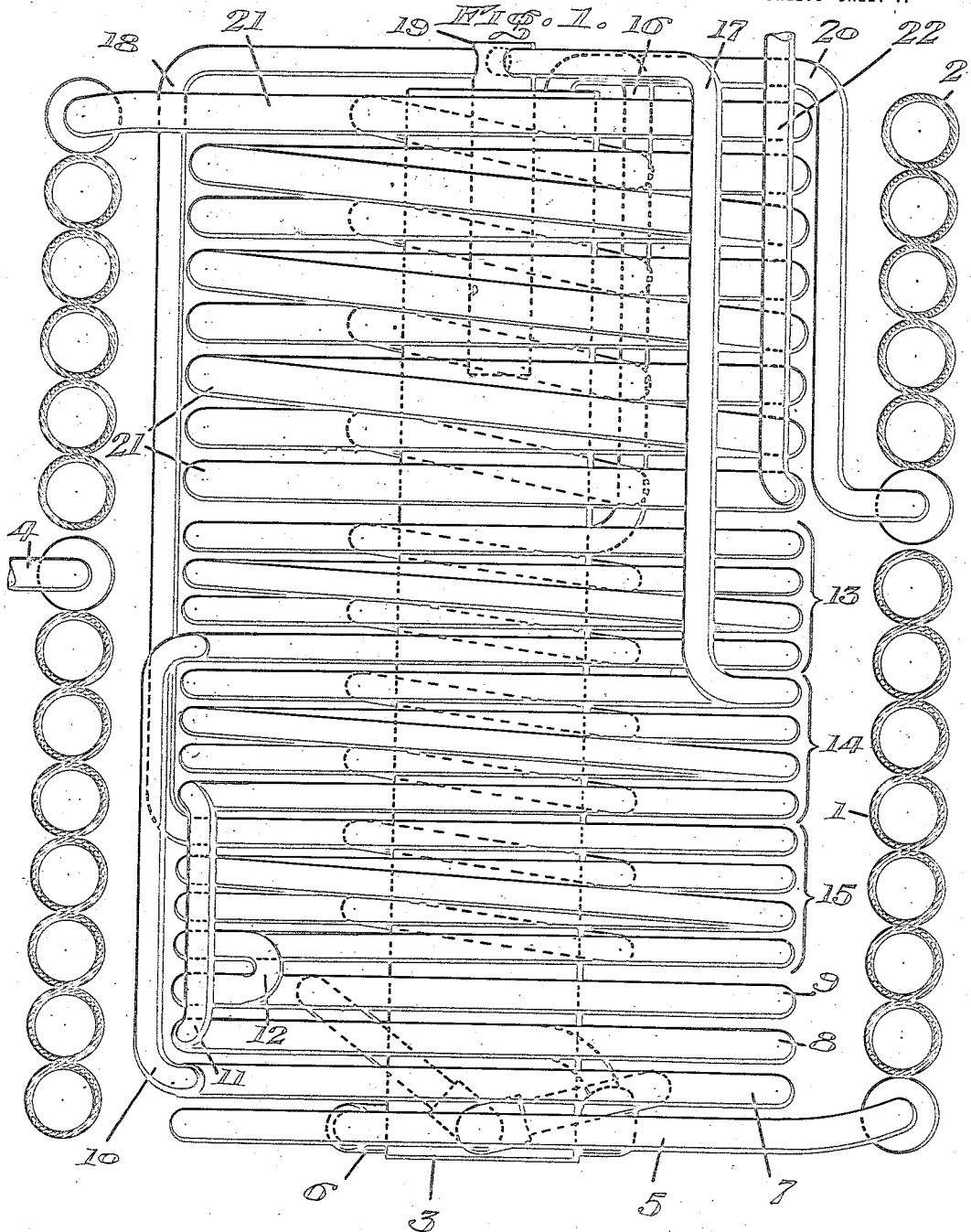

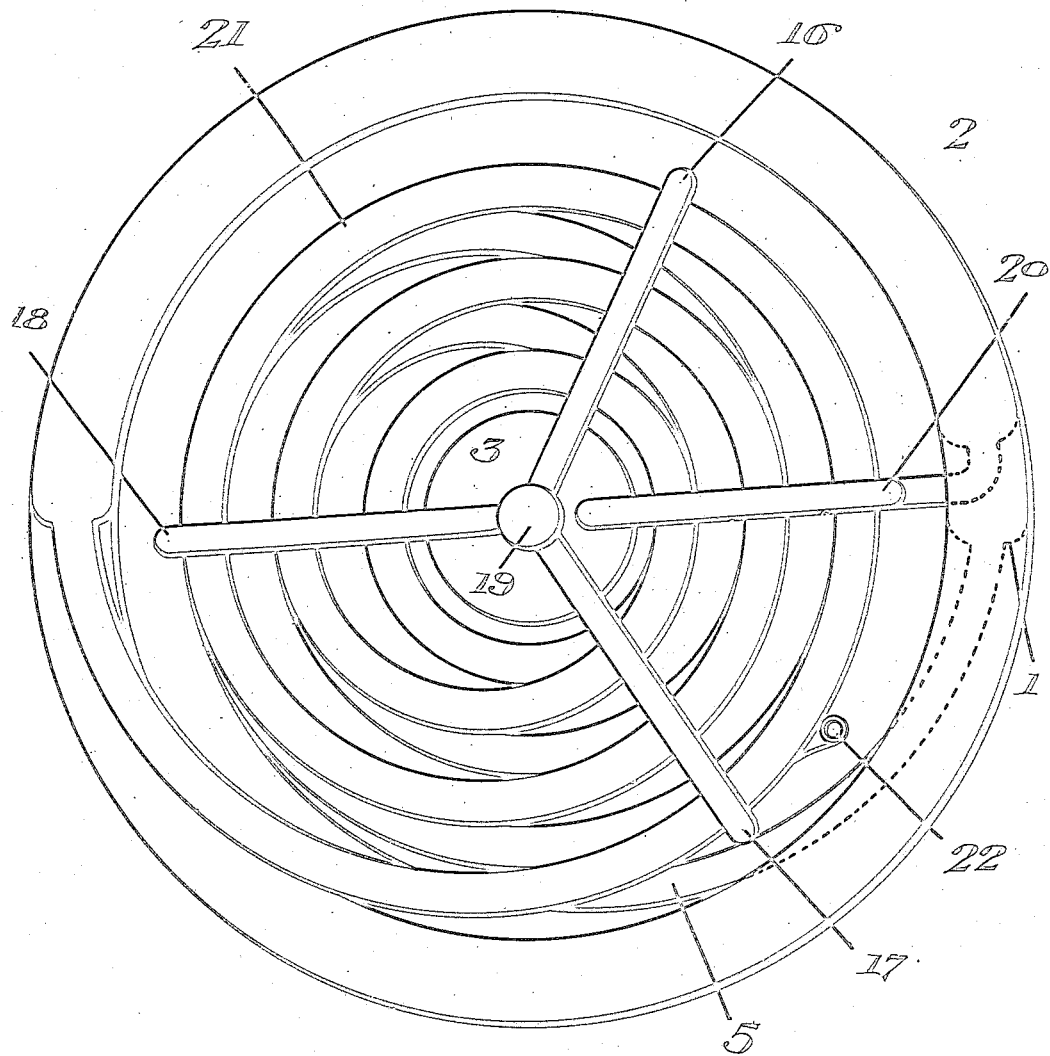

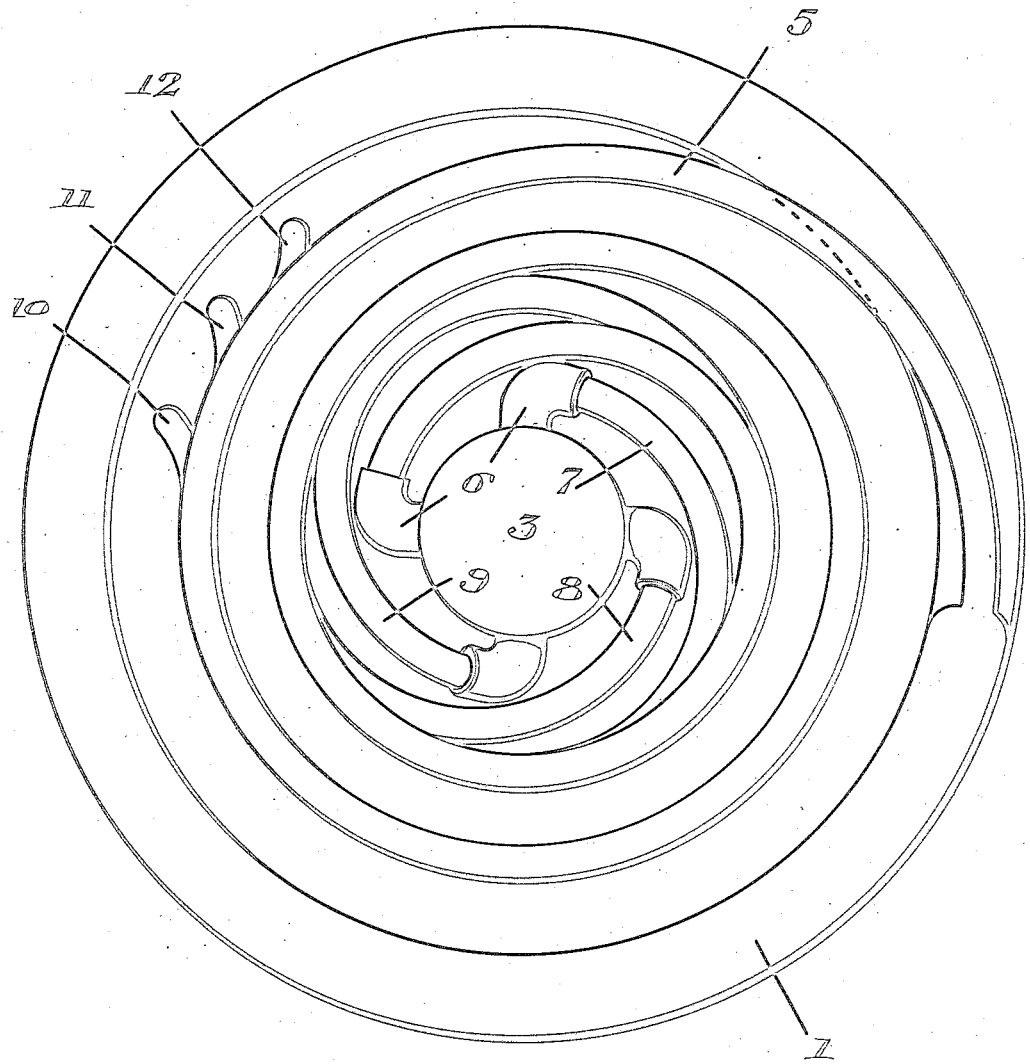

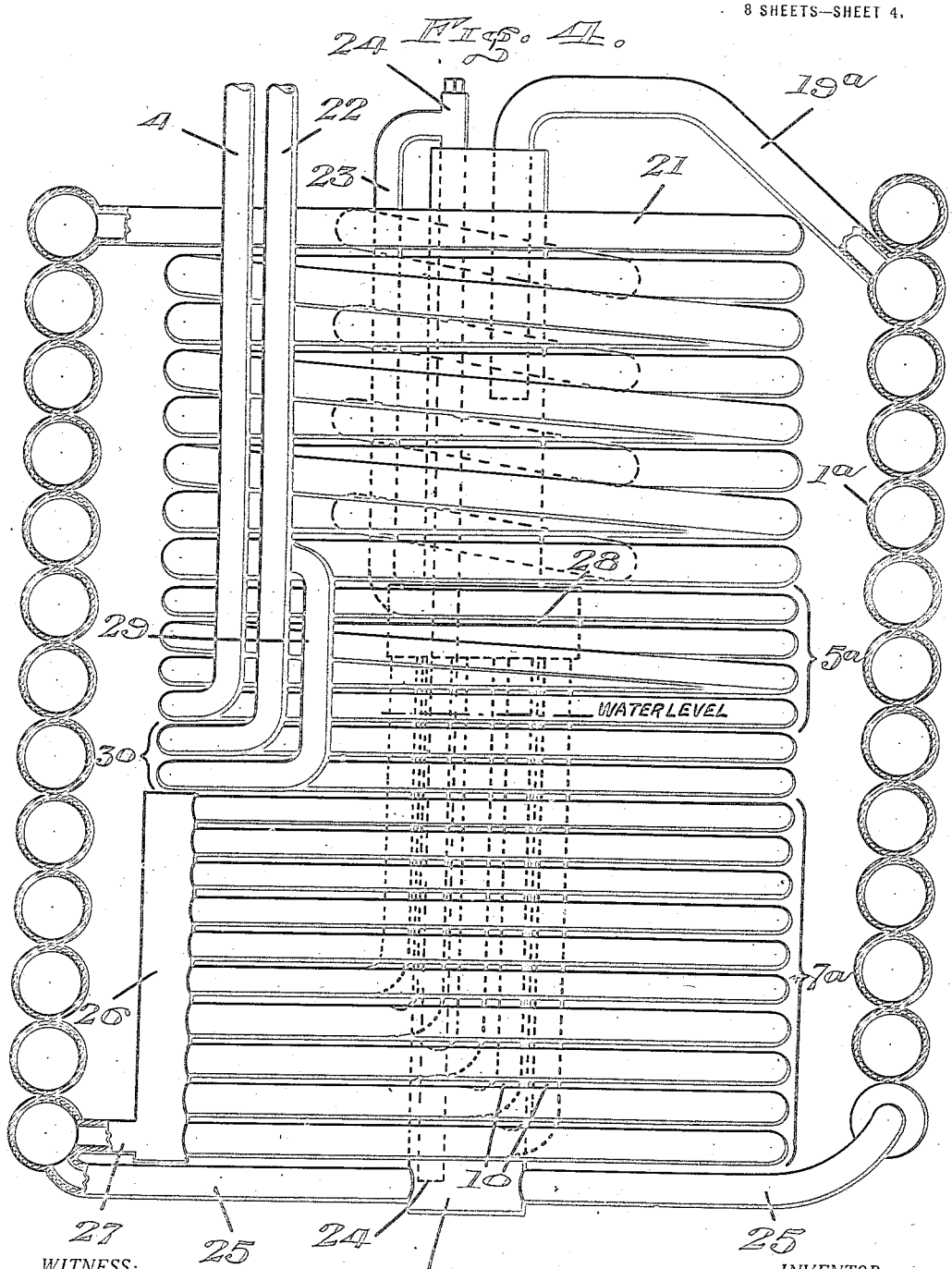

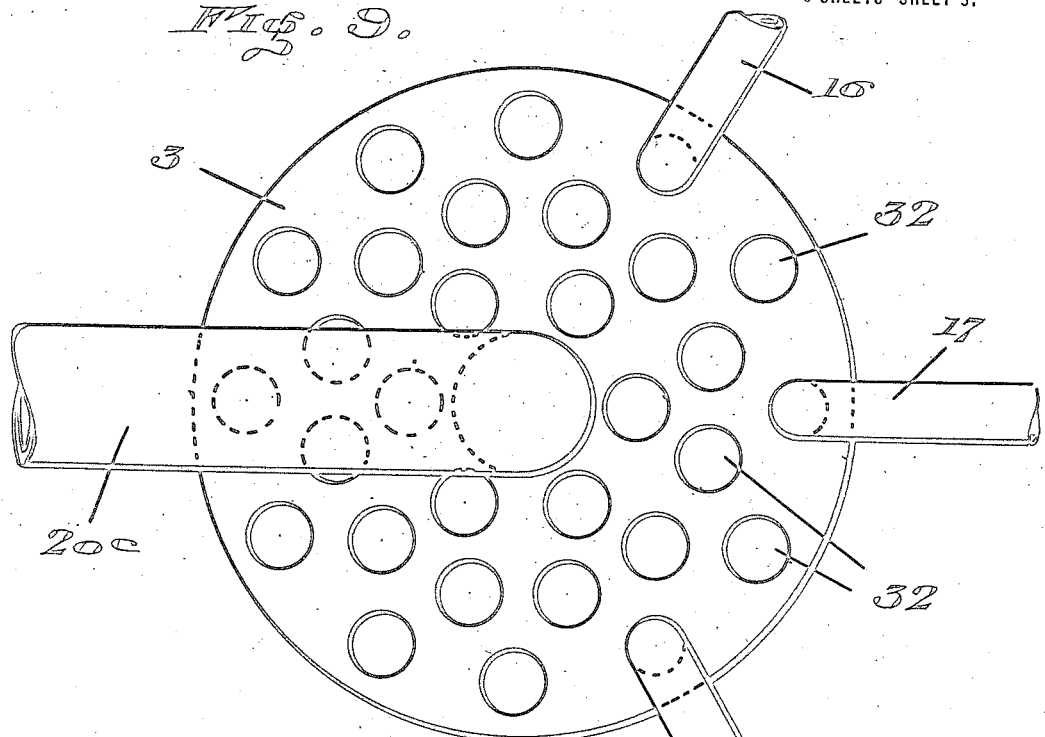
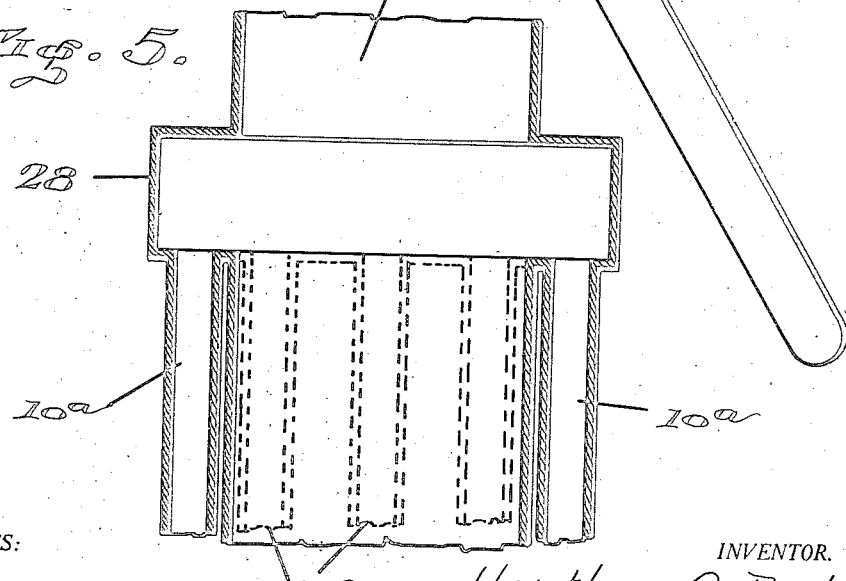

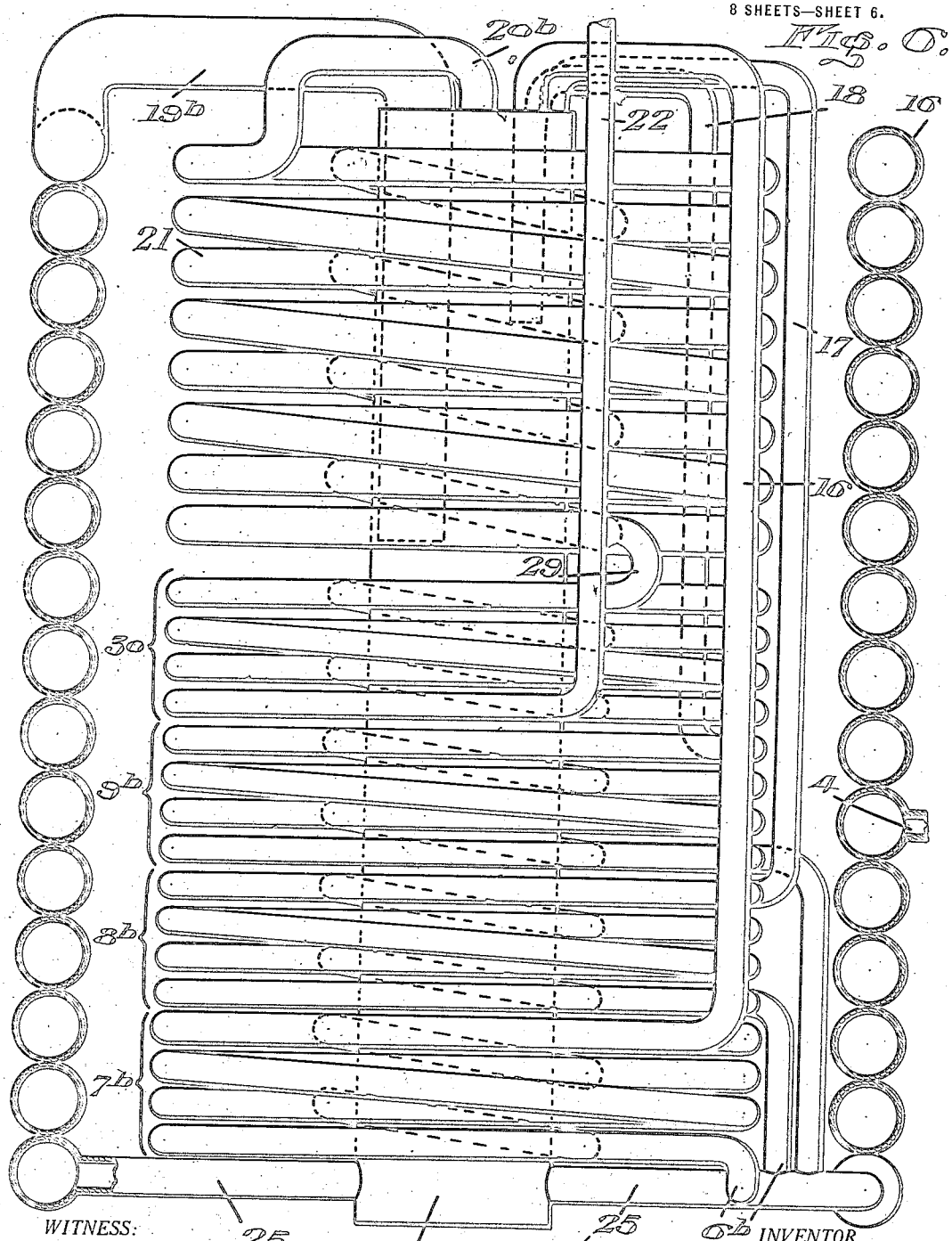

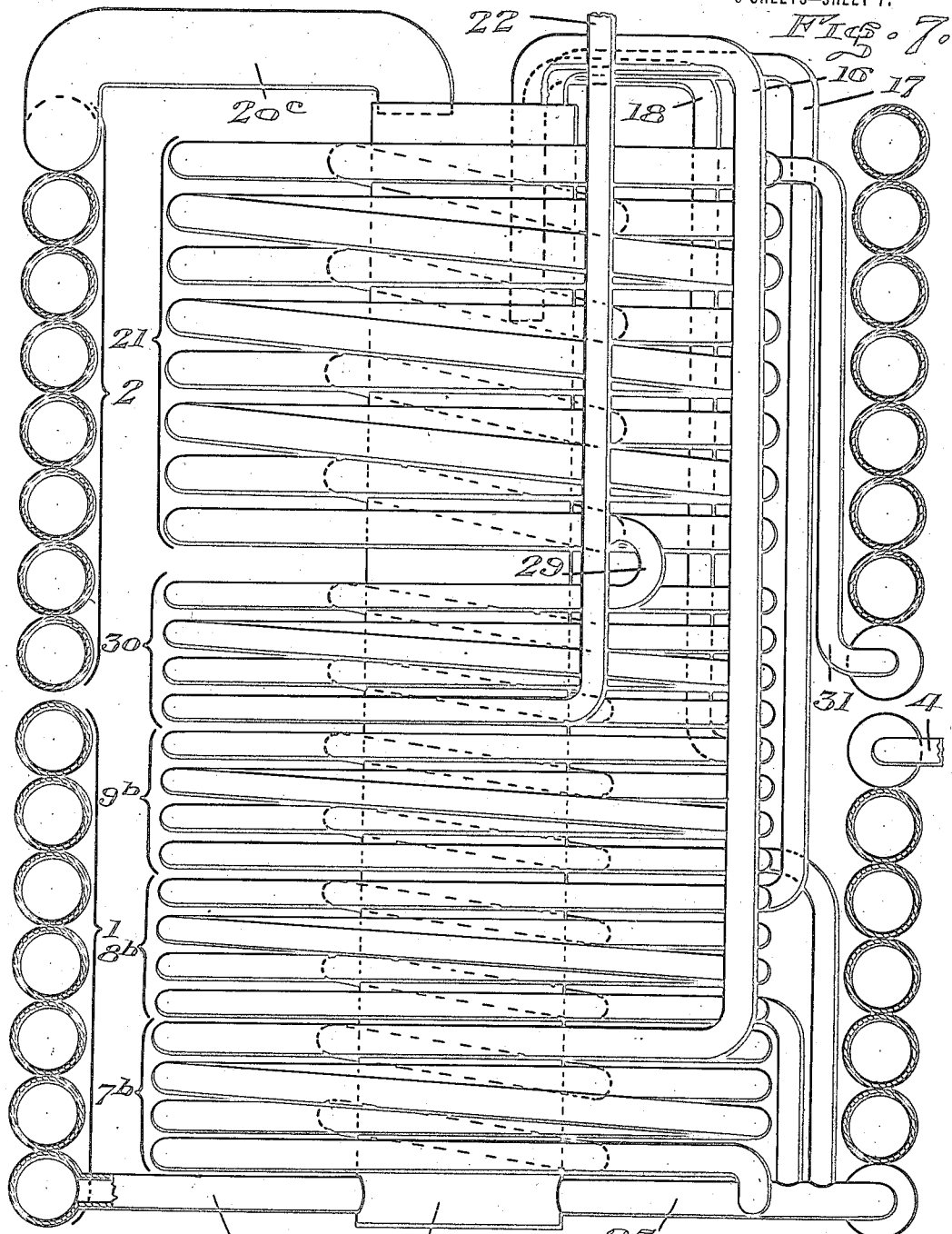

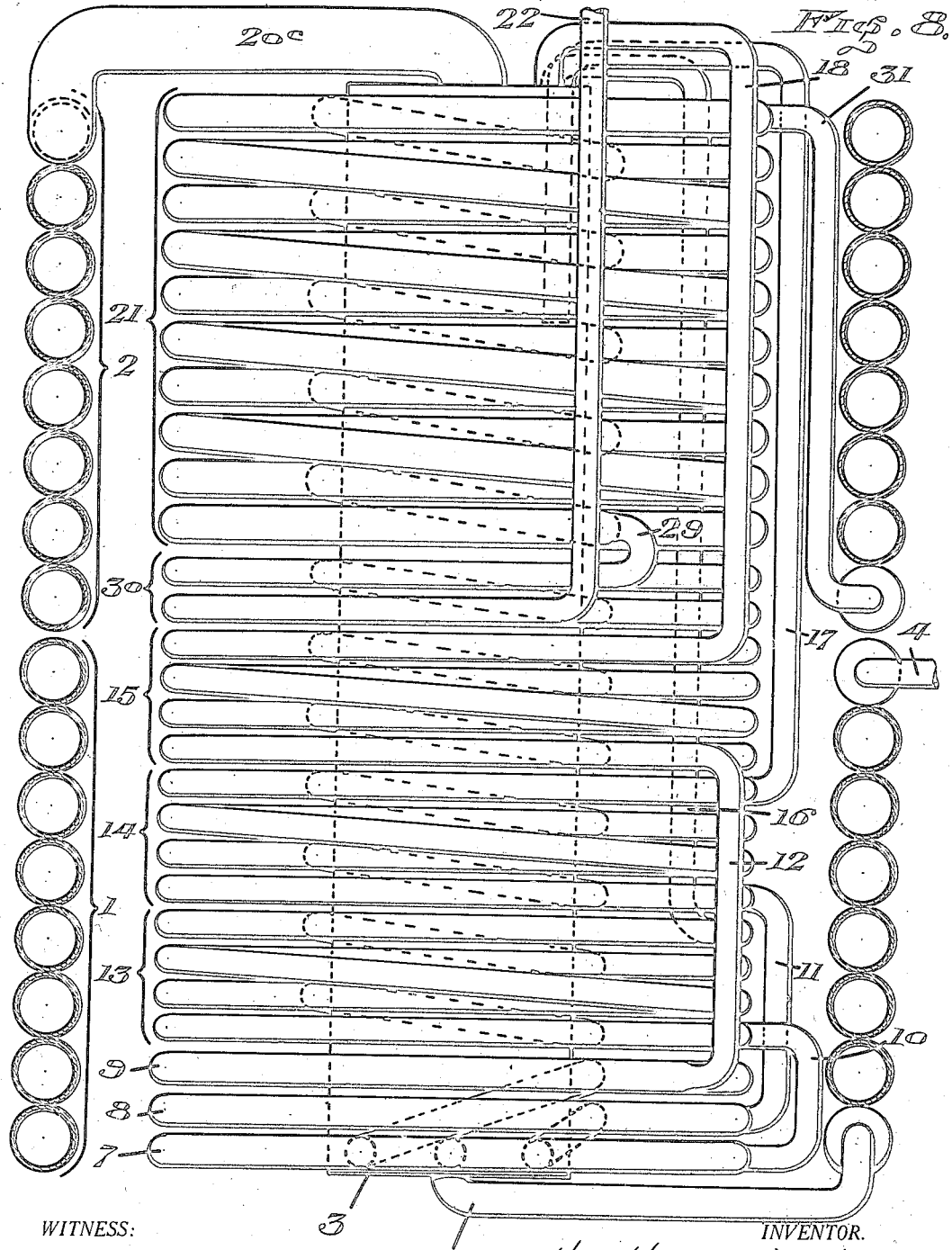

HARTLEY O. BAKER, OF PUEBLO, COLORADO, ASSIGNOR TO THE BAKER STEAM MOTOR CAR AND MANUFACTURING CO., INC., OF PUEBLO, COLORADO.

WATER-TUBE BOILER.

1,425,162.  Specification of Letters Patent.  Patented Aug. 8, 1922.

Application filed March 29, 1919. Serial No. 286,002.

*To all whom it may concern:*

Be it known that I, HARTLEY O. BAKER, a citizen of the United States, residing at Pueblo, in the county of Pueblo and State of Colorado, have invented certain new and useful Improvements in Water-Tube Boilers; and I do hereby declare the following to be a full, clear, and exact description of the invention, such as will enable others skilled in the art to which it appertains to make and use the same.

The present invention relates to water tube boilers or steam generators, and is an improvement over the water tube boilers disclosed in my copending application for patent filed Jan. 3, 1919, Serial No. 269,432.

The object of the invention is the provision of a boiler composed of tubing or coils arranged in a novel manner for the efficient heating and flashing of the water into steam and also providing for the storage of water and steam, and the boiler also including a drum or a stand pipe to which the tubing or coils are connected, in order to facilitate the circulation of water and steam, so that the circulation will be rapid and free, to enhance the quick and abundant production of steam.

A further object is the provision of such a boiler embodying a central drum or stand pipe with surrounding coiled tubing and novel connections between the tubing and drum, whereby the lower portion of the drum and tubing are filled with water which is supplied constantly thereto, to prevent the bottom portion of the boiler from being colored by the heat, burnt through or otherwise deteriorated, while the upper portion of the drum and tubing contain the steam, and the arrangement and connections being such that the water and steam can circulate freely and in a manner to obtain maximum production of steam with minimum heat and time.

A still further object is the combination of the coiled tubing with the central drum or stand pipe in such a way that the water level in the lower portion of the drum and tubing will be equalized, and the pressure of the steam against the water also equalized, in order that the production of steam and resultant pressure will not retard the flow of water or force the water beyond the parts of the boiler provided for it. In order that the boiler can have the benefits of circulation through tubing as in flash boilers, without the usual objections of said tubing construction wherein the water in flowing into highly heated portions of the tubing is flashed into steam, thus creating back pressure that will retard the flow of water and also permit the flash portion of the tubing to become excessively heated, colored and deteriorated. The arrangement is such that the water can circulate freely between the lower portions of the drum and tubing, the steam passing upwardly in the tubing and drum, and any water carried upwardly therewith dropping downwardly in the drum to return back to the water in the lower portion of the boiler, while the steam which passes upwardly has an independent circulation to the point of discharge and exerting pressure on the water at all points so as to equalize the pressure.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is an elevation of the boiler showing the water and steam reserve coils in section.

Figures 2 and 3 are top and bottom plan views, respectively.

Figure 4 is a view similar to Figure 1 of the preferred form.

Figure 5 is a sectional detail of the central portion of the drum of Figure 4.

Figures 6, 7 and 8 are views similar to Figures 1 and 4, showing other variations in the boiler construction.

Figure 9 is a plan view of the drum or stand pipe showing flues therein.

The present boiler, like that shown in the application above referred to, as well as the steam generator disclosed in the copending application filed Dec. 6, 1917, Serial No. 205,813, is composed chiefly of tubing, and embodies the water reserve and steam reserve coils 1 and 2, respectively, which are of helical formation as illustrated, with the steam reserve coil above the water reserve coil so as to constitute a jacket surrounding the other coils for retaining the products of combustion within this jacket, and therefore conserve heat, which may be supplied from below by any suitable source. The coils 1 and 2 do not have a direct connection, but are independent, the lower one providing for a large water reserve for the boiler, and the upper one providing a large steam reserve space, whereby water and steam are both held in reserve in abundant quantities so as to avoid interruptions and provide a constant generation and supply of steam.

Located centrally within and concentric with the coils 1 and 2 is a vertical drum or stand pipe 3 of cylindrical or other suitable form, and constituting a hollow core or chamber for the boiler for the purpose of equalizing the pressure and affording free circulation of water and steam. The water supply pipe 4 is connected to the upper end of the water reserve coil 1 so that this coil 1 is constantly supplied and filled with water, which will receive its initial heat in said coil, and a spiral water heating coil 5 surrounds the lower end of the drum 3 within the lower portion of the coil 1, and has its outer end connected to the lower end of the coil 1 to receive water therefrom, while the inner end of the coil 5 is connected to one side of the drum adjacent to its lower end. This coil 5 is constantly supplied with water from the water reserve coil 1, and is disposed immediately above the flames, but this coil 5 like the other lowermost coils is always supplied with water, so as to prevent the excessive heating of the coils which are subjected to the greatest heat, thus avoiding the coloring of the lower portion of the boiler and consequent deterioration or burning through. This coil 5 also supplies water to the lower end of the drum. The water will also be heated within the lower portion of the drum which is constantly supplied from the coil 5.

Superposed above the coil 5 are similar spiral coils 7, 8 and 9 for heating the water and generating the steam and the inner ends of said water heating and steam generating coils 7, 8 and 9 are connected to the different sides of the drum 3 adjacent to the lower end thereof. Elbows 6 can be used for connecting the coils 5, 7, 8 and 9 to the drum, and the connections are welded so as to avoid screw threads and similar connections which are constantly subject to leakage. The water flows from the lower portion of the drum into the coils 7, 8 and 9 in which the water is heated further and the generation of steam started, and connections 10, 11 and 12 lead upwardly from the outer discharge end of the coils 7, 8 and 9, respectively, for conducting the water and steam upwardly to the respective steam generating and heating coils 13, 14 and 15 which are superposed above the lowermost coils 5, 7, 8 and 9. Each set of the coils 13, 14 and 15 comprises several superposed spiral sections alternately connected at their inner and outer ends, as disclosed in my patent No. 1,409,515, dated March 14, 1922, and the vertical arrangement or location of the coils 13, 14 and 15 is reversed with respect to the coils 7, 8 and 9, the coil 7 being connected to the lower end of the coil 13, the coil 8 to the lower end of the coil 14, and the coil 9 to the lower end of the coil 15. Thus, of the coils 7 and 8 and 9, the lowermost discharges into the uppermost coil 13 of the steam generating and heating coils, and the intermediate coil 8 discharges into the intermediate coil 14 while the upper coil 9 discharges into the lower coil 15. The tubing of the coils 5, 7, 8, 9, 13, 14, 15, is of relatively small diameter, while the tubing of coils 1 and 2 is of relatively large diameter for purpose of capacity. Steam conducting pipes or tubes 16, 17 and 18 extend upwardly from the upper ends of the respective coils 13, 14 and 15 and at their upper ends extend inwardly over the upper end of the drum 3, and are welded to the sides of a downwardly extending steam discharge pipe 19 which extends downwardly through the upper end of the drum to a suitable distance below said upper end, thereby discharging the steam and any particles of water carried therewith into the drum at a point below its upper end. The steam will rise from the lower end of the pipe 19 around the sides thereof, while any particles of water delivered into the drum with the steam will pass downwardly and drop into the water in the lower portion of the drum so that this drum constitutes a trap for catching any particles of water lifted with the steam and returning said particles to the water in the lower portion of the boiler. Furthermore, the steam pressure is exerted downwardly on the water in the drum 3, as well as downwardly in the coils 13, 14 and 15, to equalize the pressure on the water so that there will be no tendency for the water level to rise in the coils or drum.

Connected to the upper end of the drum 3 is a steam discharge pipe tube 20, leading to and connected to the lower end of the steam reserve coil 2 to deliver the steam into this coil which is of large capacity so as to hold steam in reserve and keep same heated. A steam heating and superheating coil 21 is disposed within the coil 2 around the drum above the coil 13, and comprises superposed spiral sections connected alternately at their inner and outer ends. The tubing of the coil 21 is of larger diameter than the tubing of the coils 7, 8, 9, 13, 14 and 15, but is of smaller diameter than the tubing of coils 1 and 2, and is of substantially the same formation as coils 13, 14 and 15. The upper end of the coil 21 is connected to the upper end of the coil 2 so as to receive the steam from the steam reserve coil, and the steam in passing through the coil 21 will be heated and then superheated. From the lower end of the coil 21 the steam is discharged through the steam supply pipe 22 which leads to the engine or other device using the steam.

The coils 5, 7, 8, 9, 13, 14, 15 and 21 are all of spiral formation, some of them comprising superposed spiral sections as described, and said coils all surround the drum 3 and are located within the outermost coils 1 and 2. The connections are made by welding, so that the tubing and drum constitute an integral unit which is not apt to spring a leak, and the connections are on the exterior of the drum and coils so as to be accessible for purpose of repairs.

In operation, the water flows downwardly into the coil 1 which will hold a considerable quantity of water in reserve so that the supply of water to the lower portion of the boiler will be constant, without danger of the lower coils going dry. The water flows from the lower end of the coil 1 through the coil 5 into the drum, the water receiving its initial heat in the coil 1 and then passing directly over the flames in the coil 5 to be heated further so that it enters the drum as hot water. From the lower portion of the drum the water flows upwardly into the coils 7, 8 and 9 in divided streams, and the water will be heated in said coils and the generation of steam started, it being noted that said coils are down low close to the flames, and that the water rises from the lower portion of the drum into the coils 7, 8 and 9 and then the water and steam rise through the respective connections 10, 11 and 12 into the steam heating and generating coils 13, 14 and 15 in which the water is further heated and the steam generated and heated to pass upwardly through the respective pipes 16, 17 and 18 to the drum by way of the pipe 19. As above explained any particles of water carried upwardly with the steam will be discharged downwardly from the pipe 19 to fall back into the body of water in the lower portion of the drum, while the steam will rise within the drum to the upper end thereof, and will pass through the pipe 20 to the reserve coil 2 which is of relatively large capacity so as to hold a quantity of steam in reserve to provide for a constant supply even under heavy loads. Furthermore, it will be noted that the steam discharging into the drum 3 which constitutes a part of the lower water chamber, will equalize the pressure within the drum 3 and coils 13, 14 and 15, so that the water level will remain the same in said coils and drum. It will also be noted that the water in being heated within the drum will give off steam which will rise directly within the drum to the upper end thereof so that the use of the drum or stand pipe will be of advantage in several respects. The drum serves as a by-pass between the steam and water chambers so as to equalize the pressure in the water chamber, and from the upper end of the drum, the steam passes off through the pipe 20 into the steam reserve coil 2, and from this coil passes through the steam heating and superheating coil 21, which is at the top of the coils surrounding the drum within the coils 1 and 2.

Figures 4 and 5 show several modifications, one of which resides in the use of a helical coil $1^a$ at the outside continuous from end to end and providing for both a water and steam reserve, the water being in the lower portion and the steam in the upper portion of said coil, the tubing of which is of relatively large diameter for purpose of capacity. The water supply pipe 4 is connected to the water heating coil $5^a$ surrounding the drum within the coil $1^a$, and composed of superposed spiral sections, and a pipe or tube 23 extends upwardly from the coil $5^a$ to conduct the water upwardly into the upper end of a vertical water delivery pipe or tube 24 which extends downwardly through the upper end of the drum $3^a$ and within said drum to a point near the lower end thereof, so that the water which is heated in the coil $5^a$ is delivered from the pipe 24 into the lower end of the drum. The lower portion of the drum $3^a$ is connected by branch pipe 25 with the lower convolution of the coil $1^a$ so that the water will flow from the drum into the lower portion of the coil $1^a$ so as to maintain equal water levels in the coils and drum and to also equalize the pressures therein. Superposed spiral water heating and steam generating coils $7^a$, of which there may be any suitable number, surround the lower portion of the drum within the coil $1^a$ and have their outer ends connected to short vertical stand pipe 26, the lower portion of which is connected to the lower convolution of the coil $1^a$ by means of a connection 27. Thus, the water in the lower portion of the drum and coil $1^a$ will flow upwardly into the stand pipe 26 and into the coils $7^a$ in a number of streams, and the water in the coils $7^a$ will be heated and converted into steam, being directly over the flames. The upper ends of the coils $7^a$ are extended upwardly around the drum $3^a$, as at $10^a$, and are connected to an outwardly offset or enlarged portion 28 of the drum $3^a$ near the center or between the ends thereof. Thus, the water and steam flow upwardly from the inner ends of the coils $7^a$ back into the drum above the water level therein which is below the enlarged portion 28 and above the uppermost coil $7^a$ the steam passing upwardly from the delivery ends 10ª of the coils, while any particles of water delivered into the drum will drop downwardly therein back into the water, thus separating the water and steam, and also bringing the steam pressure to bear against the water in the lower portion of the drum to equalize the pressure. In this connection, it will be noted that a pipe or tube 19ª is connected to the upper portion of the coil 1ª and extends downwardly through the upper end of the drum 3ª, to provide a by-pass between the upper portions of the coil 1ª and drum so that steam can pass from the drum into the upper portion of the coil 1ª which serves as a steam reserve chamber, any steam generated in the lower portion of the coil 1ª also passing upwardly. From the upper end of the coil 1ª the steam passes into the steam heating coil 21 surrounding the drum and located above the water heating coil 5ª. From the lower end of the coil 21, the steam passes through a connection 29 into a steam superheating coil 30 between the coils 5ª and 7ª, and steam is delivered from the coil 30 to the steam discharge pipe 22.

In the modification shown in Figure 6, there is an outer helical coil 1ᵇ continuous from one end to the other, and the water supply pipe 4 is connected to the coil 1ᵇ between its upper and lower ends to deliver the water into this coil, and it passes from the lower convolution thereof through the branch pipes 25 into the lower portion of the drum 3, and if desired, the branch pipe 25 may be disposed spirally so as to also constitute a water heating coil at the bottom of the boiler, as shown in Figure 1. The water thus passes from the lower portion of the coil 1ᵇ into the lower portion of the drum. Superposed water heating and steam generating coils 7ᵇ, 8ᵇ and 9ᵇ are disposed around the drum and their lower ends are connected as at 6ᵇ, to one of the branch pipes 25 so that the water will flow upwardly into said coils from the lower portion of the coil 1ᵇ and drum 3. From the coils 7ᵇ, 8ᵇ, and 9ᵇ, the steam flows upwardly through the respective pipes or tubes 16, 17 and 18 that extend downwardly through the upper end of the drum to deliver the steam thereinto, the particles of water falling down into the drum to return to the body of water in the lower portion of the boiler. A pipe 19ᵇ also extends from the upper end of the coil 1ᵇ downwardly through the top or upper end of the drum to deliver any steam from the upper convolutions of the coil 1ᵇ into the drum, said upper portion of the coil 1ᵇ serving as a reserve steam space, because the steam can flow either way between the drum 3 and coil 1ᵇ. The upper end of the steam heating coil 21 is connected, as at 20ᵇ, to the upper end of the drum to receive the steam therefrom, and the lower end of the coil 21 has a connection 29 leading to the steam superheating coil 30 between the coils 21 and 9ᵇ, and the steam discharge pipe leads from the coil 30, the same as in Figure 4.

The construction shown in Figure 7 is a compromise between those shown in Figures 1 and 6, there being a lower water reserve coil 1 and an upper steam reserve coil 2 with the water supply pipe 4 connected to the upper end of the coil 1, and the lower end of said coil 1 connected by the branch pipes or coil 25 with the lower portion of the drum 3 to deliver the water into the drum. The water heating and steam generating coils 7ᵇ, 8ᵇ and 9ᵇ are as shown in Figure 6, and pipes 16, 17, and 18 lead upwardly therefrom and discharge downwardly through the upper end of the drum into same. The upper end of coil 2 is connected, as at 20ᶜ, with the upper end of the drum, so that the steam flows from the upper end of the drum into the steam reserve coil 2, and a pipe 31 leads from the lower end of said coil 2 to the upper end of the steam heating coil 21 from which the steam flows through the superheating coil 30 and out through the discharge pipe 22.

The structure shown in Figure 8 is similar to that shown in Figure 7, and embodies additional features of the structure shown in Figure 1. Thus, a pipe or coil 25ᶜ connects the lower end of the coil 1 with the lower end of the drum 3 to deliver the water into said drum, and coils 7, 8 and 9 such as shown in Figure 1, surround the lower portion of the drum and have their inner ends connected thereto, and connections 10, 11 and 12 extend upwardly from their outer ends and are connected to the steam generating and heating coils 13, 14 and 15. The pipes 16, 17 and 18 leading upwardly from the respective coils 13, 14 and 15 extend downwardly through the upper end of the drum, as in Figure 7, instead of being connected to a pipe 19 as in Figure 1. Otherwise the construction is almost the same as shown in Figure 1 as so far described. However, the upper end of the coil 2 is connected as at 20ᶜ with the upper end of the drum, as shown in Figure 7, and the pipe 31, coil 21, coil 20 are about the same as shown in Figure 7, differing from the arrangement shown in Figure 1.

Figure 9 shows a further modification, in that the drum 3 is provided with vertical flues 32 through which the products of combustion can pass upwardly, whereby to heat the water and steam within the drum from the interior as well as the exterior. These flues 32 can be used in any of the drums shown to increase the heating facilities of the drum.

Having thus described the invention, what is claimed as new is:—

1. A boiler embodying a vertical drum, water heating and steam generating coils surrounding the lower portion of the drum, steam heating coils surrounding the upper portion of the drum, tubing surrounding said coils and constituting a lower water reserve coil and an upper steam reserve coil, the lower portion of the water reserve coil, drum and water and steam generating coils being connected for the flow of water therebetween, the discharge terminals of the steam generating coils being extended upwardly above said steam generating coils and connected to the drum for the flow of steam from said coils into the drum above said steam generating coils, and the steam heating and steam reserve coils being connected one to the other and to the upper portion of the drum.

2. A boiler embodying a vertical drum, superposed spiral water heating and steam generating coils surrounding the drum at the lower portion thereof, a spiral steam heating coil surrounding the drum above the aforesaid coils, helical tubing surrounding the aforesaid coils to provide a jacket therefor and providing a lower water reserve coil and an upper steam reserve coil, the lower portions of the water reserve coil, water heating and steam generating coils and drum being connected for the flow of water therebetween, the discharge terminals of the steam generating coils being extended upwardly above said steam generating coils and connected to the upper portion of the drum to deliver steam thereinto above said steam generating coils, and the steam heating and steam reserve coils being in communication with one another and with the upper portion of the drum to receive steam therefrom.

3. A boiler comprising a vertical drum, generating coils surrounding the lower portion of the drum, a jacket constituting a lower water reserve chamber and an upper steam reserve chamber, the lower portion of the water reserve chamber, drum and generating coils being in communication for the flow of water therebetween, the delivery terminals of said generating coils extending upwardly above said coils and discharging into the drum above said coils, a steam chamber surrounding the upper portion of the drum above said generating coils, and the upper portion of said drum, steam reserve chamber and steam chamber being in communication, the steam reserve chamber surrounding said steam chamber.

4. A boiler embodying a vertical drum, water heating and steam generating coils surrounding the lower portion of the drum, steam heating coils surrounding the upper portion of the drum, a jacket surrounding said coils constituting a lower water reserve chamber and an upper steam reserve chamber, the lower portion of the water reserve chamber, drum and water and steam generating coils being in communication for the flow of water therebetween, the delivery terminals of the water heating and steam generating coils extending upwardly above said coils and discharging into the drum above said coils, means for conducting steam from the upper portion of the drum into the steam reserve chamber, and the upper portion of said steam reserve chamber and steam heating coils being in communication.

In testimony whereof I have signed my name to this specification in the presence of two subscribing witnesses.

HARTLEY O. BAKER.

Witnesses:
 FRONIE ABELL,
 PAULINE S. BROWN.